April 25, 1939.  A. RYDQUIST  2,155,738
MOUNTING FOR ROBE CORDS
Filed April 6, 1938  3 Sheets-Sheet 1
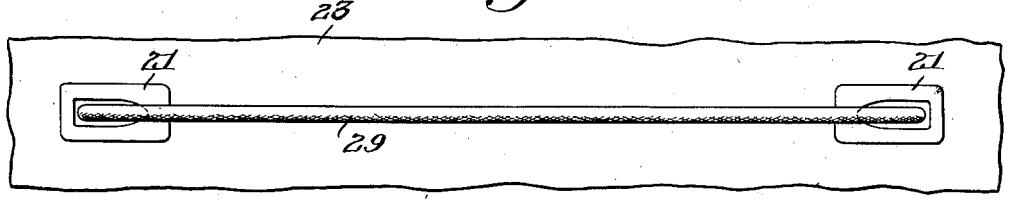
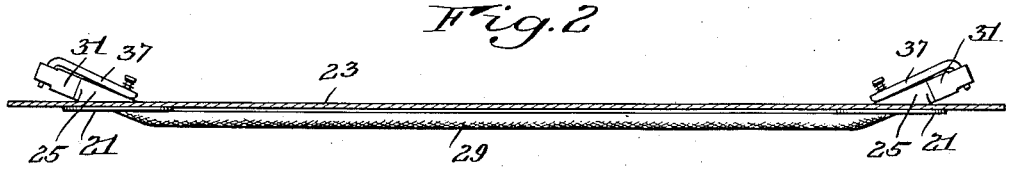
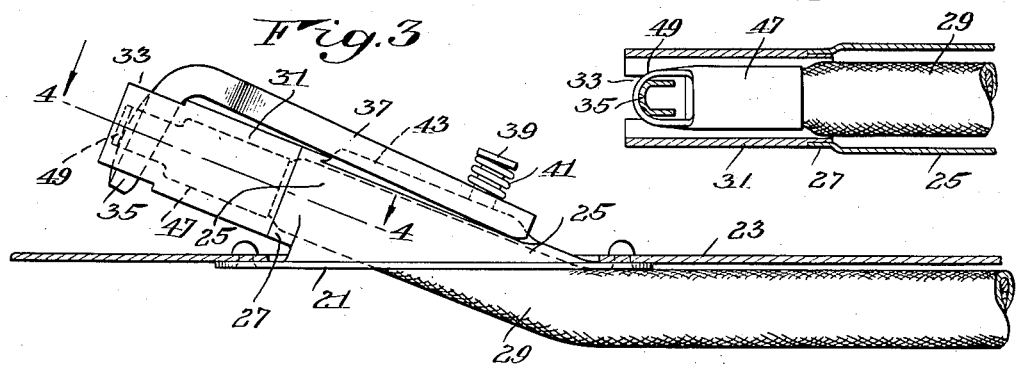
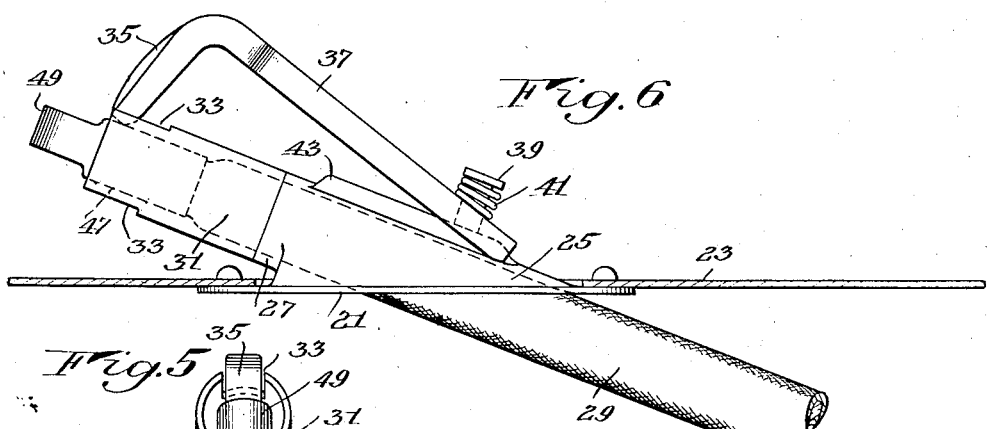
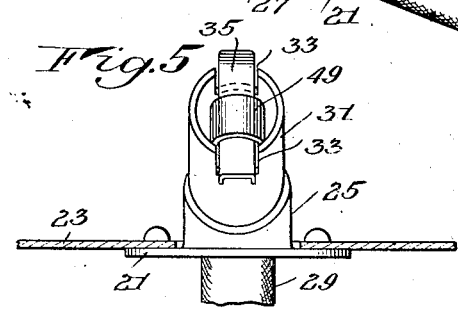
INVENTOR.
Adolph Rydquist
BY Cumpston & Shepard
his ATTORNEYS

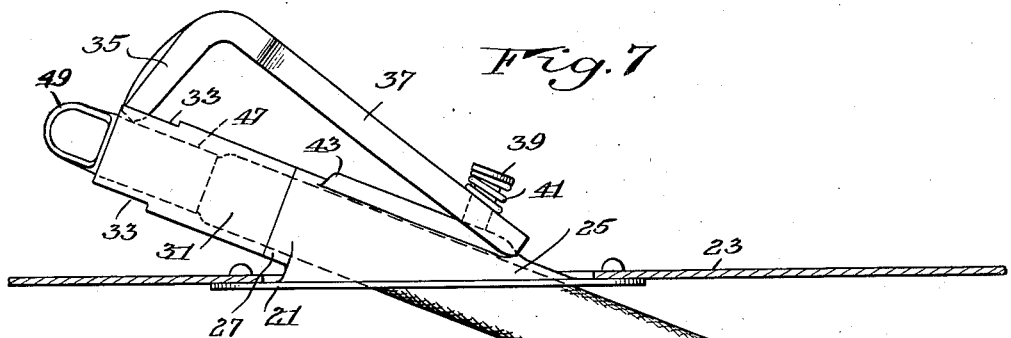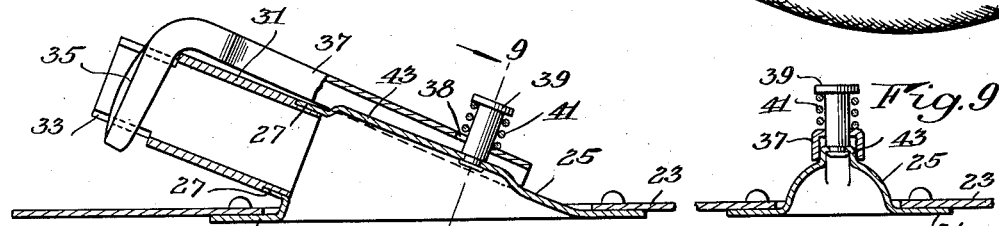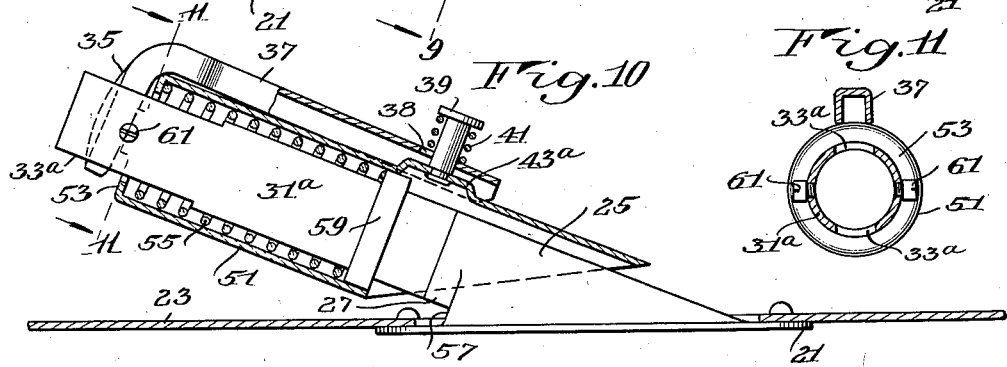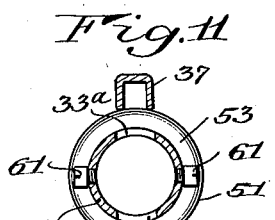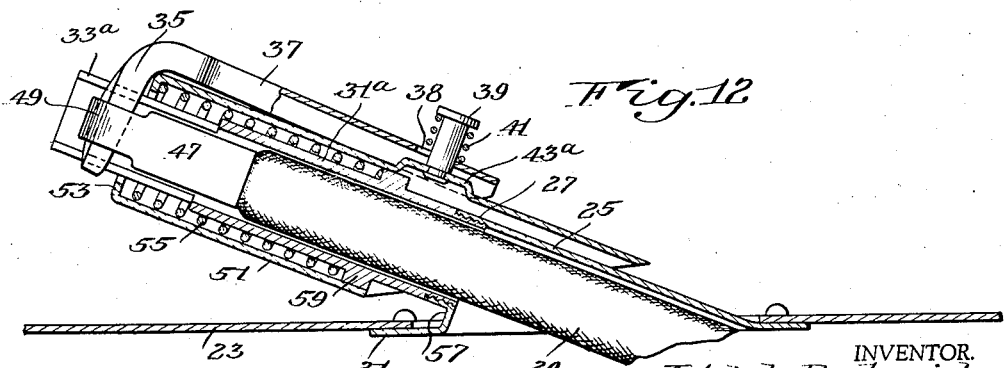

April 25, 1939. A. RYDQUIST 2,155,738
MOUNTING FOR ROBE CORDS
Filed April 6, 1938 3 Sheets-Sheet 3
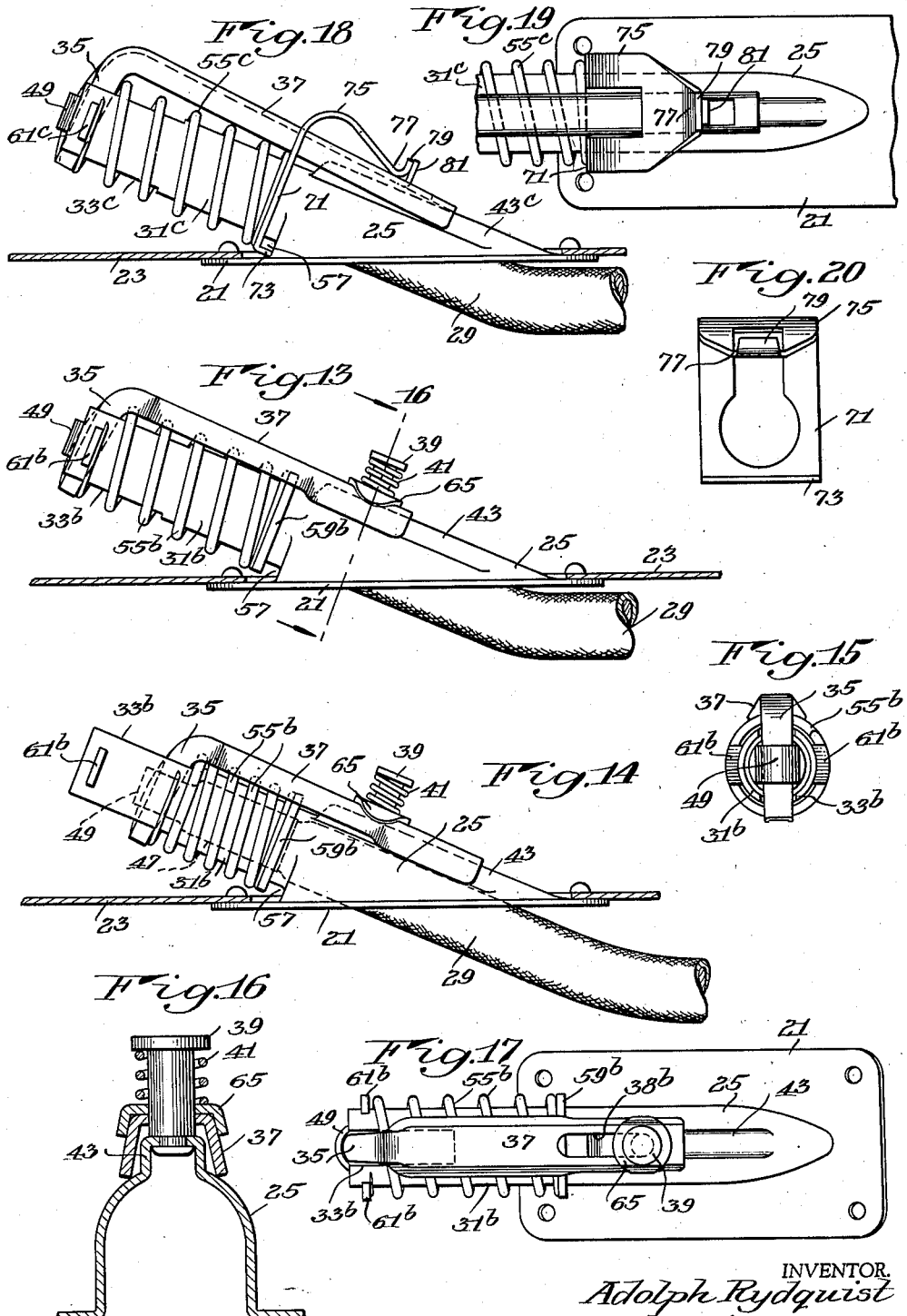

Patented Apr. 25, 1939

2,155,738

UNITED STATES PATENT OFFICE 2,155,738

MOUNTING FOR ROBE CORDS

Adolph Rydquist, Rochester, N. Y., assignor to The Schlegel Manufacturing Company, Rochester, N. Y., a corporation of New York Application April 6, 1938, Serial No. 200,474

15 Claims. (Cl. 24—123)

This invention deals with a mounting for the ends of a cord or strap such as is commonly placed on the rear side of the front seat of an automobile, to provide a support for a robe or other article which it is desired to hang thereon. Although intended primarily for mounting cords or straps of this kind, many features of the invention may be used also for mounting other types of cords or elongated elements.

An object of the invention is the provision of a simple and effective mounting of the recessed type, having no projecting parts which can cause injury to anyone who might be thrown against the rear surface of the front seat as a result of an accident.

Another object is the provision of a mounting so designed that the cord may be engaged with or disengaged from the mounting without the use of tools and without the necessity of removing any part of the mounting.

Still another object is the provision of a mounting so designed and constructed that it may be fastened to the back of the seat or other structure on which it is placed, by blind fastening means.

A further object is the provision of a mounting so made that a cord may be effectively connected therewith simply by thrusting the cord longitudinally into an opening in the mounting, in proper relation thereto, and in which the cord may be subsequently disengaged in an easy manner if desired.

To these and other ends the invention resides in certain improvements and combinations of parts, all as will be hereinafter more fully described, the novel features being pointed out in the claims at the end of the specification.

In the drawings:

Fig. 1 is a rear elevation of a fragment of the front seat of an automobile, illustrating a robe cord held by a pair of mountings of the present invention;

Fig. 2 is a view of the parts shown in Fig. 1 partly in plan and partly in horizontal section;

Fig. 3 is a view partly in plan and partly in horizontal section, on a larger scale, of a mounting constructed in accordance with a preferred embodiment of the invention, with the cord effectively locked in normal position therein;

Fig. 4 is a longitudinal section substantially on the line 4—4 of Fig. 3;

Fig. 5 is an end view of the parts shown in Fig. 3;

Fig. 6 is a view similar to Fig. 3, with the cord moved to a different position illustrating the first stage of disengaging the cord from the mounting;

Fig. 7 is a view similar to Fig. 6, showing the next stage in disengaging the cord from the mounting;

Fig. 8 is a horizontal central section through the parts shown in Fig. 3 with the cord removed;

Fig. 9 is a section substantially on the line 9—9 of Fig. 8;

Fig. 10 is a view similar to Fig. 8, illustrating a modified form of construction;

Fig. 11 is a section substantially on the line 11—11 of Fig. 10;

Fig. 12 is a view similar to Fig. 10 showing further details of this modified form of construction;

Fig. 13 is a plan of another modified construction with the parts in one position;

Fig. 14 is another view of the parts shown in Fig. 13 but in a different position;

Fig. 15 is an end view thereof;

Fig. 16 is a section taken substantially on the line 16—16 of Fig. 13;

Fig. 17 is a rear elevation of the parts shown in Fig. 13;

Fig. 18 is a plan of still another embodiment of the invention;

Fig. 19 is a rear view of a fragment shown in Fig. 18, and

Fig. 20 is an end view of a clip forming part of the construction shown in Figs. 18 and 19.

The same reference numerals throughout the several views indicate the same parts.

In the preferred form of construction the mounting for each end of the robe cord (using the term "robe cord" in a broad sense as including any kind or type of elongated flexible element) comprises an escutcheon plate 21 to be secured to the back wall 23 of the front seat structure. The escutcheon plate has a central opening with a rounded rear wall 25 at an angle to the face of the plate as shown, one end of the wall 25 being formed into an annular or tubular part 27 of the right size to receive the end of a robe cord indicated in general at 29. A tubular extension 31, fixed to the portion 27, forms a prolongation of the fixture at an acute angle to the face of the escutcheon plate 21. The end of the tubular extension 31 is provided with slots 33 at diametrically opposite points, to serve as lateral guides for the effective end 35 of a hook member, the shank 37 of which is provided with an opening or hole 38 through which extends a headed pin 39 riveted or otherwise secured to the wall 25 of the fixture. A coiled spring 41 surrounds the pin 39 and reacts at one end against an enlarged head on the pin and at the other end against the shank 37 of the hook in a direction to tend constantly to move the hook to its effective or closed position shown in Figs. 3 and 8. By the exertion of sufficient force, the hook may, however, be moved to the open position shown in Figs. 6 and 7, by compressing the spring 41, the hole 38 being sufficiently larger than the pin 39 to permit the hook to swing to open position.

Since the end 35 of the hook lies in the slots 33 of the tubular member 31, the edges of these slots guide the hook against lateral displacement, so that the hook lies approximately in a plane passing centrally through the guiding slots 33 and centrally along the axis of the tubular extension 31. If desired, either as a further guide to prevent lateral deflection of the hook or as the sole guide with the omission of the guiding slots 33, the wall 25 of the mounting fixture may be pressed outwardly as indicated at 43 to form a ridge extending for some distance along the shank of the hook beneath the same, and the shank 37 itself may be of generally U-shaped form as shown in Fig. 9, with the open side toward the ridge 43 so that the side edges of the hook lie on opposite sides of the ridge 43 and the ridge thus forms a guide preventing lateral deflection of the hook. The effective end 35 of the hook may be of the same U-shaped construction.

The end of the robe cord 29 is provided with a ferrule or clip 47 having an eye at its end, formed by a U-shaped metallic strap 49. When the cord is mounted in normal effective position in the mounting fixture, the end 35 of the hook extends through the eye 49 of the cord, as shown in Figs. 3 and 4, thus effectively locking the cord against outward withdrawing movement from the fixture. An outward pull on the cord pulls upon the end 35 of the hook, and this in turn is resisted either by the bottom edges of the end 35 resting on the bottoms of the slots 33 or by the edge of the hole 38 in the shank resting against the side of the pin 39, or in both of these ways.

The end 35 of the hook is purposely made at an appreciable angle to an arc struck on a center at the hole 38 in the shank on which the hook pivots, the direction of the end 35 being such as to diverge away from such an arc in a direction from the shank 37 toward the free end of the portion 35. With this arrangement, the under edge of the hook portion 35 presents a surface substantially inclined to the longitudinal axis of tube 31, and pressure against it, in a direction longitudinally along the tube 31, will open the hook against the action of the spring 41, while pressure in the opposite direction against the upper side of the hook portion 35 will have the effect of closing the hook more firmly.

With this construction, the robe cord may be engaged with or disengaged from the mounting fixture entirely by proper manipulation of the cord itself, without the necessity for using any tools whatever and without need for taking apart or otherwise adjusting the mounting fixture. To insert the cord in the mounting the end of the cord is thrust into the tube 31 of the mounting structure, with the eye 49 faced in the proper direction to receive the hook 35. The inward thrust of the end of the eye 49 bears against the bottom edge of the hook portion 35, opens the hook against the action of the spring 41, and as soon as the opening in the eye comes under the end of the hook, the spring 41 will close the hook through the eye, preventing withdrawal of the robe cord.

If for any reason it is necessary to remove the robe cord, this may be done by shoving the robe cord further into the fixture. This will open the hook in the same manner as when the robe cord was first inserted, except that the pressure on the under side of the hook will be produced by the bottom of the eye or the end of the ferrule 47, instead of by the extreme end of the eye 49. The parts will now be in the position shown in Fig. 6. Then after the hook is opened by such further inward thrust of the cord, the cord is turned approximately 90° about its own longitudinal axis, so as to bring the side of the eye strap, rather than the opening of the eye, into alinement with the end of the hook 35, this position being illustrated in Fig. 7. Then the robe cord may be withdrawn from the mounting fixture, the end of the hook riding smoothly over the side of the eye during the withdrawing movement, as apparent from Fig. 7.

Since it is not necessary to remove the escutcheon plate 21 or any other part of the mounting fixture when a robe cord is to be inserted or removed, the escutcheon plate 21 may be fastened on the wall 23 by any suitable blind fastening means. For example, there may be lugs projecting rearwardly from the plate 21, extending through openings in the wall 23 and clamped over on the rear surface of the wall. Or rivets may be used, preferably countersunk on the exposed surface of the escutcheon plate 21. Or the escutcheon plate may be welded directly to the metal wall 23. Of course, accessible screws or other visible and removable fastening means may be employed, if desired, although there is no necessity for the use of any removable fastening means.

Referring now to the modified construction shown in Figs. 10 to 12, the escutcheon plate 21 and portion 25 may be substantially the same as before. A tubular extension 31a is employed, similar to the tubular extension 31 of the previous embodiment, and this extension has hook guiding slots 33a similar to the previous slots 33, but longer in an axial direction along the tube. The hook 35, 37 and the stud 39 and spring 41 may be the same as before, but in this instance, the stud 39 is not mounted directly on the body 25, but rather on a separate sleeve 51 surrounding the tube 31a and part of the member 25 and slidable longitudinally thereon. The end of this tube 51 remote from the escutcheon plate 21 is flanged inwardly as at 53. In the annular space between the members 31a and 51 is a coiled spring 55, which presses at one end against the flange 53 of the sleeve 51 and thus tends to move the sleeve leftwardly when viewed as in Figs. 10 and 12. The right hand end of the spring 55 may react against the crotch or shoulder 57 formed between the escutcheon plate 21 and the annular portion 27, or preferably it reacts against a collar or rib 59 formed on or secured to the sleeve 31a, which collar or rib also serves as a bearing for the sleeve to aid in holding the sleeve centered in proper alinement on the tube 31a.

Suitable abutment means formed on the tube 31a limits movement of the sleeve 51 in a leftward direction under the influence of the spring 55. For example, stud screws 61 (Figs. 10 and 11) may be screwed into the sides of the member 31a to contact with the left end of the sleeve 51 to limit motion thereof. The sleeve 51, adjacent the stud 39, may be formed with a ridge 43a to fit in the hollow space between the side walls of the hook shank 37, in a manner similar to the ridge 43 previously described, to assist in guiding the hook.

This embodiment of the invention operates in the same way as the embodiment previously described, so far as the insertion and withdraw of the robe cord are concerned, and except for the differences above described, the construction may be the same as the previously described embodiment, the same reference numerals being used for corresponding parts. In addition to the functions described in connection with the previous embodiment, this present embodiment performs the further function of allowing limited longitudinal movement of the robe cord. A pull on the robe cord (as, for example, when the cord 29 is pulled outwardly away from the wall 23 to hang a robe on the cord) will pull the hook portion 35 toward the escutcheon plate 21, and this in turn will slide the entire sleeve 51 (on which the hook is mounted) rightwardly toward the escutcheon plate, compressing the spring 55. The extent of such rightward movement is limited either by contact of the hook portion 35 with the bottom edges of the slots 33a, or by contact of the right end of the sleeve 51 with the fixed crotch or notch 57, or by both of such means. When the displacing force is removed, the spring 55 again moves the sleeve 51 leftwardly, carrying with it the hook 35 and thus drawing the end of the robe cord leftwardly to tighten the cord again. The maximum extent of leftward movement is limited by the screw studs 61, so placed that when this maximum extent of movement is reached, the hook 35 is still within the notches 33a. If the robe cord be shoved still further leftwardly, the sleeve 51 can not move leftwardly because of its contact with the studs 61 and the further leftward movement of the robe cord will open the hook 35 and disengage the cord therefrom, in the manner described in connection with the first embodiment.

Referring now to the alternative embodiment shown in Figs. 13 to 17, the construction here includes an escutcheon plate 21 and portion 25 similar to those previously described, together with a tubular extension 31b similar to the previous extension 31. As in the case of the embodiment of Figs. 10 to 12, the slot 33b is of substantial length in an axial direction to allow for axial movement of the hook. The hook 35, 37 is mounted, as in the first embodiment, on a stud 39 secured to the portion 25 of the fixture, a coiled spring 41 surrounding the stud to tend to hold the hook in closed position. In the present case, however, the hole 38b in the shank 37 of the hook, through which the stud 39 extends, is a slot having a substantial axial length, so that the hook may slide back and forth lengthwise of the fixture through a considerable range.

A coiled spring 55b surrounds the tube 31b between the hook portion 35 and the escutcheon plate 21. The right end of this spring reacts against the crotch 57 or preferably against an abutment 59b on the tube 31b, while the left end of the spring reacts against the underside of the hook end 35, the maximum leftward movement of the spring being limited by lugs 61b extending radially outwardly on opposite sides of the tube 31b near the left end thereof.

A washer 65 is placed on the stud 39 between the spring 41 and the hook shank 37, so that the force of the spring 41 presses downwardly upon the shank, but does not interfere substantially with longitudinal movement of the shank. Leftwardly beyond the end of the slot 38b the side walls of the U-shaped shank are flared outwardly, as shown at 37a in Figs. 14 and 17, so that this part of the shank will clear the abutment 59b and the spring coils 55b and will not rub excessively on the abutment and the spring during longitudinal movement of the hook.

The length of the slot 38b is made such that the end 35 of the hook can move leftwardly to a point just beyond the left end of the spring 55b when this end of the spring is at its maximum leftward position against the abutments 61b. In this position, therefore, the spring does not exert any force on the underside of the hook 35, and the hook may be opened and closed to engage or disengage the eye 49 in the end of the robe cord, exactly as in the embodiment first described. When the robe cord is engaged on the hook, a pull on the cord can move the entire hook 35, 37 toward escutcheon plate 21 to allow the end of the cord to be withdrawn to a limited extent from the mounting fixture, the spring 55b compressed during such movement and the hook shank 37 sliding past its mounting stud 39 to an extent permitted by the length of the slot 38b. When the pulling force on the robe cord is removed, the spring 55b retracts the cord in a leftward direction when viewed as in Fig. 14, to a maximum extent determined by the end of the spring 55b coming into contact with the stops 61b.

Referring to Figs. 18, 19 and 20, still another embodiment of the invention is here shown, this embodiment dispensing with the spring 41 on the stud 39, and utilizing only a single spring to hold the hook in closed position and to allow limited longitudinal movement of the hook. The escutcheon plate 21 and portion 25 may be as before, while the extension 31c and abutments 61c may be substantially the same as the corresponding extension 31b and abutments 61b in the last preceding embodiment. A pronounced and elongated ridge 43c is formed on the portion 25 of the fixture 21, similar to but more pronounced than the ridge 43 of the first embodiment described, in order to form a guide for the end of the shank 37 of the hook. This shank, as before, is of U-shaped cross section fitting over the ridge 43c and slidable longitudinally thereon. The hook end 35 is slidable longitudinally in the long slots 33c.

A metal clip has a portion 71 surrounding the tubular part of the mounting fixture as shown, and a lip or flange 73 at one edge of this portion of the clip bears in the crotch 57 of the structure. At the opposite edge from the lip 73 the clip extends upwardly on both sides of and free of the hook shank 37 and is then bent backwardly and downwardly at 75 to lie on and press against the top of the shank 37 at 77, this portion of the clip terminating in an upwardly bent lip 79. A coiled spring 55c surrounds the tubular extension 31c between the clip 71 and the hook end 35, as shown.

An ear or lug 81 formed on the shank 37 of the hook abuts against the lip 79 of the clip, to limit movement of the hook in a leftward direction when viewed as in Fig. 18. The lug 81 preferably does not come into contact with the lip 79, however, until the effective end 35 of the hook is at or beyond the point at which the left end of the spring 55c is stopped by the abutment 61c, so that in this position the spring does not press on the underside of the hook end 35 and does not cause direct friction on the hook to interfere with opening and closing movement thereof.

With this construction, when the end of the robe cord is thrust leftwardly into the tubular portion of the mounting fixture, the leftward pressure of the end of the eye 49 against the underside of the hook portion 35 will throw this hook portion laterally to open the hook as described in connection with the first embodiment disclosed. The opening movement of the hook will swing the shank 37 about its right hand end as a pivot, and this swinging of the shank will displace the portion 77 of the clip in a direction away from the escutcheon plate 21. This will cause the portion 71 of the clip to tilt in a leftward or counterclockwise direction about the corner of the flange 73 as the axis of oscillation. Such leftward tilting of the clip 71 is, of course, resisted by the force of the spring 55c so that the spring pressure against the clip 71 constantly tends to hold this clip in such manner that the portion 77 presses on the top of the shank 37 to tend to hold the hook in normal closed position, or to return it to such position when it has been displaced therefrom. The force exerted by the clip on the shank of the hook is relatively light, however, being quite near the end of the shank, and is easily overcome by reasonable endwise pressure of the robe cord 29 when it is desired to engage or disengage the robe cord from the hook.

When the robe cord is engaged with the hook a rightward pull on the cord can move the entire hook and the end of the cord in a rightward direction, sliding the hook end 35 longitudinally along the slots 33c, and sliding the right end of the shank 37 longitudinally along the guiding ridge 43c. During such sliding, the clip 71 remains approximately stationary but the shank of the hook slides beneath the portion 77 of the clip. When the displacing force on the robe cord is released, the spring 55c returns the hook leftwardly, pulling the cord farther into the mounting fixture to its original position determined by the stops 61c.

Any suitable type of cord may be employed, either elastic or non-elastic, in any of the forms of construction above disclosed. In the form disclosed in connection with Figs. 1 to 9, where there is no spring means to allow for longitudinal movement of the hook, it is preferable that the robe cord be of the elastic type, that is, one which can be stretched or elongated in a lengthwise direction, and which will return to its original length when the displacing force is removed. In those mounting fixtures which have provision for longitudinal sliding of the hook, as disclosed in connection with Figs. 10 to 20, then an elastic robe cord may be employed, but it is usually preferable to employ a non-elastic or non-stretching cord, for the longitudinal sliding of the hook by compressing the spring 55, 55a, etc., provides for sufficient slack in the robe cord to permit robes or other articles to be hung thereon when desired, while at the same time keeping the cord relatively taut and neat appearing when nothing is hung thereon.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A mounting for a robe cord or the like having an eye near one end, said mounting comprising means forming a passageway into which said end of said cord may be longitudinally thrust, and movable latching means extending crosswise of said passageway and adapted to pass through said eye, said latching means being so mounted that inward thrust of the end of said eye against said latching means will automatically retract said latching means to permit said end of said eye to pass until the opening of said eye is alined with said latching means, whereupon said latching means will automatically enter said eye.

2. A construction as described in claim 1, in which said latching means includes a shank portion extending in a general direction along said passageway and a lateral portion extending from said shank portion in a general direction across said passageway to extend into said eye.

3. A construction as described in claim 2, in which said latching means includes a shank portion extending in a general direction along said passageway, a lateral portion extending from said shank portion in a general direction across said passageway, and means acting on said shank portion to tend to hold said lateral portion resiliently in a position across the path of said eye when said end of said cord is thrust into said passageway.

4. A mounting for an elongated element having an eye near one end, said mounting comprising a tubular portion forming a passageway into which said eye may be moved, said tubular portion having guiding slots in opposite walls thereof, a hook member having a shank extending in a general direction along said passageway exteriorly thereof and having an effective end extending laterally from said shank and through said slots and across said tubular portion to pass through said eye to hold said elongated element, and spring means cooperating with said shank of said hook member to tend to maintain said end of said hook member in effective position extending across said tubular portion.

5. A mounting for an elongated element having an eye near one end, said mounting comprising a tubular portion forming a passageway into which said eye may be moved, a stud mounted on and projecting outwardly from said tubular portion, a hook member having a shank loosely mounted on said stud and having an effective end at a substantial distance from said stud to extend in a general direction across said passageway to pass through said eye to hold said elongated element, and spring means surrounding said stud and acting upon said shank to hold said end in effective position across said passageway, said spring means being deformable so that said end may be moved to another position for releasing said eye.

6. A mounting for an elongated element having an eye near one end, said mounting comprising a tubular portion forming a passageway into which said eye may be moved, a hook member having a shank portion extending in a general direction along said passageway exteriorly thereof and having an effective end portion extending in a general direction crosswise of said passageway to pass through said eye, said hook member being mounted for limited bodily movement in a direction longitudinally of said passageway to permit limited longitudinal movement of said eye and said elongated element, and spring means resisting said longitudinal movement of said hook member in one direction.

7. A mounting for an elongated element, said mounting including a tubular portion into which one end of said element may be thrust and by which said end is confined to movement longitudinally of said tubular portion, and spring actuated latching means for automatically engaging said element when said end thereof is thrust into said tubular portion, to hold said end against retraction therefrom.

8. A mounting for an elongated element having an eye near one end, said mounting including means forming a passageway into which said end of said element may be thrust, and latching means movably carried on said mounting for engaging said eye when said end of said element is thrust into said pasageway, to hold said eye against retraction therefrom, and spring means for moving said latching means into engagement with said eye, said latching means and said eye being relatively inclined and disengageable by further inward thrust of said elongated element.

9. A mounting for a robe cord, or the like, having an end fastening recess, said mounting comprising an opening for receiving said recessed cord end, and latching means carried by said mounting for movement into and out of position in said opening for engaging and releasing said cord recess and arranged to be moved out of said opening by movement into said opening of said cord.

10. A mounting for a robe cord, or the like, having an end fastening recess, said mounting comprising an opening for receiving said recessed cord end, and latching means carried by said mounting for movement into and out of position in said opening for engaging and releasing said cord recess and having an inclined surface arranged for engagement by said cord end to move said latching means out of said opening on inward movement on said cord means.

11. A mounting for a robe cord, or the like, having an end fastening recess, said mounting comprising an opening for receiving said cord end, latching means carried by said mounting for movement into and out of said opening for engaging and releasing said cord recess, and means for moving said latching means into said opening to engage said cord recess.

12. A mounting for a robe cord, or the like, having an end fastening recess, said mounting comprising an opening for receiving said cord end, latching means carried by said mounting for movement into and out of engagement with said cord recess in said opening and arranged for movement out of said opening by inward movement of said cord into said opening, and spring means for moving said latching means into engagement with said cord recess in said opening.

13. A mounting for a robe cord, or the like, having an end fastening recess, said mounting comprising an opening for receiving said cord end, latching means carried by said mounting for movement into and out of engagement with said cord recess in said opening, said latching means having a part inclined with relation to said cord end to effect movement of said latching means out of said opening by inward movement of said cord means, and spring means for moving said latching means into engagement with said cord recess in said opening.

14. A mounting for a robe cord, or the like, having an end fastening recess, said mounting comprising an opening for receiving said recessed cord end, latching means carried by said mounting for movement into and out of position in said opening for engaging and releasing said cord recess and having a part inclined with relation to said cord end for moving said latching means out of said opening by inward movement of said cord end, and spring actuated means for moving said latching means to move said cord.

15. A mounting for a robe cord, or the like, having an end fastening recess, said mounting comprising an opening for receiving said recessed cord end, and latching means carried by said mounting for movement into and out of position in said opening for engaging and releasing said cord recess and having an inclined surface arranged for engagement by said cord end to move said latching means out of said opening on inward movement on said cord means, said cord end being rotatable in said opening out of registry with said latching means when released to effect its withdrawal from said opening.

ADOLPH RYDQUIST.